United States Patent Office 3,647,628
Patented Mar. 7, 1972

3,647,628
PROCESS FOR PRODUCING L-THREONINE
Kiyoshi Nakayama, Sagamihara-shi, Japan, assignor to Kyowa Hakko Kogyo Co., Ltd., Tokyo, Japan
No Drawing. Filed Oct. 24, 1968, Ser. No. 770,387
Claims priority, application Japan, Aug. 17, 1968, 43/58,239
Int. Cl. C12d 13/06
U.S. Cl. 195—29
3 Claims

ABSTRACT OF THE DISCLOSURE

A process for producing L-threonine by fermentation which comprises culturing a microorganism which requires methionine for its growth under aerobic conditions in an aqueous nutrient medium containing (1) the required amount or more of nitrogen sources necessary for the growth of the microorganism and (2) the required amount or less of methionine for the maximum growth of the microorganism. Advantageously, at least 5 parts by weight of nitrogen per 100 parts of carbon are employed in the medium. Strains belonging to Aerobacter, Pseudomonas, Arthrobacter and Escherichia are exemplified.

---

This invention relates to a process for producing L-threonine. More particularly, it relates to a process for the production of L-threonine by fermentation. Even more particularly, the invention relates to a process for the production of L-threonine by fermentation with microorganisms which require methionine for their growth.

L-threonine is important as an essential amino acid is, accordingly, a useful substance in the biochemical field. It has been used, for example, medically as a nutrient (Rose, Fed. Proc., vol. 8, p. 546 (1949)).

One of the objects of the present invention is to provide an improved process for the production of L-threonine.

Another object of the present invention is to provide a process for producing L-threonine by fermentation which may be carried out in an efficacious and relatively simple manner.

A further object of the invention is to provide a process for producing L-threonine by fermentation which may be carried out advantageously on an industrial scale at low cost to give a high yield of product.

A still further object of the invention is to provide L-threonine.

These and other objects and advantages of the present invention will become apparent to those skilled in the art from a consideration of the following specification and claims.

In accordance with the present invention, it has been found that significant amounts of L-threonine are produced and accumulated in the resultant culture liquor by culturing L-threonine-producing microorganisms which require methionine for their growth in a nutritional medium containing the required amount of nitrogen sources and of methionine for the multiplication of the microorganisms. Specifically, the amount of nitrogen source employed in the medium comprises a ratio of five or more of nitrogen to one hundred parts of carbon, i.e., an amount sufficient or in excess of that required for the multiplication of the microorganisms. The amount of methionine employed in the medium is that required for the maximum growth of the microorganisms or less. The fermentation is carried out under aerobic conditions at a pH of about 4.0 to 9.5.

The microorganisms employed in the present invention are L-threonine-producing microorganisms which require at least methionine for their growth. The phenomenon that methionine-requiring microorganisms accumulate L-threonine in the cultured liquor is a finding novel to the art. Microorganisms which require methionine for their growth can be easily obtained by using microorganisms which do not require methionine as an original strain and conducting a mutation treatment of these microorganisms by means of, for example, ultraviolet ray irradiation, γ-ray irradiation, treatment with chemical agents, etc., or by simultaneously conducting a penicillin selection method.

The methionine-requiring strains used in the present invention include strains whose growth requirements are satisfied by using N-acylhomoserine, cystathionine or homocysteine, which are precursors of methionine, instead of methionine. Thus, they are mutants having growth requirements which are completely or incompletely closed within the stages shown by dotted lines in the following scheme in the course of the biosynthesis of methionine.

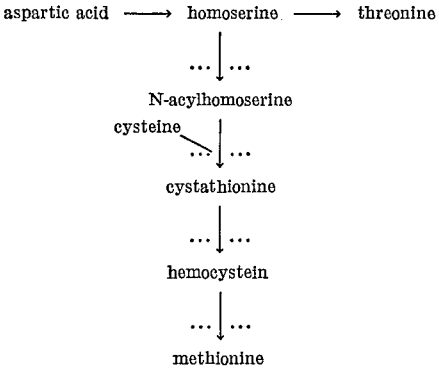

Moreover, strains having more complex growth requirements, i.e., which require substances besides methionine at the same time, are included. As exemplary of approprite microorganisms, those belonging to the family Enterobacteriaceae, the genus Arthrobacter, the genus Brevibacterium, the genus Corynebacterium or the like can be used in the present invention.

Culture media employed in the fermentation of the present invention need to contain the required amount of nitrogen sources for the growth of the microorganisms, namely, five or more parts by weight of nitrogen to one hundred parts by weight of carbon, and, simultaneously, sufficient methionine or the precursors thereof which can be substituted for methionine. Either a synthetic culture medium or a natural nutrient medium is suitable as long as it contains the essential nutrients for the growth of the strain employed. Such other nutrients are well known in the art and include substances such as a carbon source, a nitrogen source, inorganic compounds and the like which are utilized by the microorganism employed in appropriate amounts. Thus, as a carbon source, there may be mentioned, by way of example, carbohydrates such as glucose, fructose, maltose, sucrose, starch, starch hydrolysate, molasses, glycerol, mannitol, sorbitol, etc., or any other suitable carbon source such as organic acids, for example, acetic acid, lactic acid, fumraric acid, citric acid, aspartic acid and the like, hydrocarbons such as n-paraffins (alkanes), cycloparaffins, olefins, cycloolefins, aromatic hydrocarbons and mixed hydrocarbons such as kerosene, light oils, heavy oils, paraffin oils, etc. The source of carbon may be either a single substance or a mixture of two or more. As a nitrogen source various kinds of inorganic or organic salts or compounds such as urea, ammonia or ammonium salts such as ammonium chloride, ammonium sulfate, ammonium nitrate, ammonium acetate, ammonium phosphate, etc., or natural substances containing nitrogen, such as cornsteep liquor, yeast extract, meat extract, peptone, fish meal, bouillon, casein hydrolysates, casamino acid, fish solubles, rice bran extract, etc. may be employed. Again, these substances may be used either singly or in combinations of two or more. In addition, as pointed out above, the nitrogen sources are used in a ratio of five or more per one hundred parts of carbon.

Inorganic compounds which may be added to the culture medium include magnesium sulfate, sodium phosphate, potassium dihydrogen phosphate, potassium monohydrogen phosphate, ferrous sulfate, manganese chloride, calcium chloride, sodium chloride, zinc sulfate, manganese sulfate, calcium carbonate, etc.

As is conventional in the art, in the case of using strains having particular nutritional requirements besides methionine, substances which satisfy these requirements should, of course, be added to the culture medium. These include substances such as amino acids, vitamins, biotin, etc.

As discussed above, the microorganisms employed in the present invention require at least methionine for their growth, and the culture medium should contain methionine or precursors thereof which can be substituted for methionine. The amounts of methionine or precursors thereof added to the culture medium should be restricted to the required amount for the maximum growth of the micro-organisms or less. Although the concentration to be employed varies with the concentrations of the other nutrients (chiefly, the carbon sources and nitrogen sources) or with the kinds of microorganisms employed, it is usually advantageous to use a range of concentration of about 10 mg./l. to about 2 g./l. These compounds are ordinarily added to the medium in the form of methionine which is the most inexpensive and is easy to obtain. However, it should be apparent that the methionine may be supplied to the medium in the form of methionine-containing substances such as casamino acid, peptone, yeast extract, meat extract, proteins, cornsteep liquor and the like.

The fermentation or culturing of the microorganisms is conducted under aerobic conditions, such as aerobic shaking of the culture or with aeration and agitation of a submerged culture, at a temperature of, for example, about 20° to 40° C. and at a pH of, for example, about 4.0 to 9.5. In case that the pH decreases as the fermentation proceeds, the pH of the culture medium should be maintained within the described range by the addition of appropriate neutralizing agents such as ammonia, sodium hydroxide, potassium hydroxide, calcium carbonate, etc.

After about 2 to 7 days of culturing under these conditions, considerable amounts of L-threonine are produced and accumulated in the resultant liquor.

After the completion of culturing, the L-threonine can be recovered from the fermentation liquor by conventional means, such as ion exchange resin treatment, extraction with solvents, precipitation, adsorption, chromatography or the like.

The following examples are given merely as illustrative of the present invention and are not to be considered as limiting. Unless otheriwse noted, the percentages therein and throughout the application are by weight per liter of water. Microorganism strains advantageously employed in the present invention are described therein.

EXAMPLE 1

Aerobacter aerogenes KY 7059 ATCC 21316 (a methionine-requiring strain) is used as the microorganism. This microorganism is inoculated into a seed culture medium containing 2% glucose, 1% peptone, 1% yeast extract and 0.3% NaCl. It is cultured at 30° C. for 24 hours in order to obtain a seed culture.

The seed culture is inoculated in the ratio of 10% by volume into fermentation medium having the following composition (per liter of water):

Glucose: 10%
$(NH_4)_2SO_4$: 2.0%
$K_2HPO_4$: 0.05%
$KH_2PO_4$: 0.05%
$MgSO_4 \cdot 7H_2O$: 0.025%
$FeSO_4 \cdot 7H_2O$: 0.001%
$MnSO_4 \cdot 4H_2O$: 0.001%
L-methionine: 100 mg./l.
$CaCO_3$: 2%

The pH is adjusted to 7.2 with NaOH before sterilization.

Twenty ml. portions of both media are poured into 250 ml.-conical flasks, respectively, and are used after sterilization. Culturing is then carried out with aerobic shaking of the culture at 30° C. After 72 hours of culturing, L-threonine is produced and accumulated in the resultant culture liquor in the concentration of 1.0 g./l.

The threonine produced is recovered by removing the microorganism cells from the cultured liquor, adjusting the pH of the culture filtrate to 2.0 with HCl, adsorbing the filtrate on a strongly acidic cation exchange resin (Amberlite IR-120), eluting with ammonia water and then precipitating the threonine by the addition of alcohol (ethanol) after concentration.

EXAMPLE 2

Pseudomonas fluorescens KY 8521 ATCC 21256 (a methionine-requiring strain) is used as the seed strain. A seed culture thereof is inoculated in a ratio of 10% by volume into a fermentation medium having the following composition:

Glucose: 5%
$(NH_4)_2SO_4$: 2%
$KH_2PO_4$: 0.05%
$K_2HPO_4$: 0.05%
$MgSO_4 \cdot 7H_2O$: 0.025%
$FeSO_4 \cdot 7H_2O$: 10 mg./l.
$MnSO_4 \cdot 4H_2O$: 10 mg./l.
$CaCO_3$: 2%
L-methionine: 30 mg./l.
The medium has a pH of 7.2.

Fermentation is conducted in 250 ml. conical flasks containing 20 ml. portions of the fermentation medium with aerobic shaking of the culture at 30° C. for 96 hours. As a result, L-threonine is produced and accumulated in the resultant culture liquor in a concentration of 300 mg./l.

EXAMPLE 3

Arthrobacter paraffineus 42–7 ATCC 21317 (a methionine-requiring mutant strain) is employed as the seed microorganism. This microorganism is inoculated into a seed culture medium containing 2% sorbitol, 1% meat extract, 1% peptone, 0.5% yeast extract and 0.3% NaCl. The pH of the seed medium is 9.4. It is cultured at 30° C. for 24 hours in order to obtain a seed culture.

The seed culture is inoculated in a ratio of 10% by volume into a fermentation medium having the following composition (per liter of water):

n-Paraffin mixture ($C_{11}$–$C_{18}$): 10%
$(NH_4)_2SO_4$: 2%
$KH_2PO_4$: 0.2%
$K_2HPO_4$: 0.2%
$MgSO_4 \cdot 7H_2O$: 0.1%
Solution A: 1 ml./l.
Thiamine: 3 mg./l.
L-methionine: 200 mg./l.
$CaCO_3$: 3%

Solution A contains 38 mg./l. of $Na_2B_4O_7 \cdot 10H_2O$, 37 mg./l. of $(NH_4)_2 \cdot 6Mo_7O_{24} \cdot 4H_2O$, 970 mg./l. of $FeCl_3 \cdot 6H_2O$ 8.8 mg./l. of $ZnSO_4 \cdot 7H_2O$, 20 mg./l. of $CuSO_4 \cdot 5H_2O$ and 7.2 mg./l. of $MnCl_2 \cdot 4H_2O$. The pH of the medium is 7.4.

Twenty ml. portions of both media are poured into 250 ml.-conical flasks, respectively, and are used after sterilization. Culturing is then carried out with aerobic shaking of the culture at 30° C.

After 96 hours of culturing, the amount of L-threonine produced in the culture liquor is 18.9 mg./ml.

EXAMPLE 4

*Arthrobacter paraffineus* 42–7 ATCC 21317 (a methionine-requiring mutant strain) is used as the microorganism. Culturing is conducted under the same conditions and in the same manner as described in Example 3, except that 5% of sorbitol instead of the n-paraffin mixture is used in the fermentation medium and that the amount of $CaCO_3$ is 2%. The amount of L-threonine produced as a result of the fermentation is 5.1 mg./ml.

EXAMPLE 5

*Escherichia coli* KY 8270 ATCC 21318 (a methionine-requiring strain) is used as the microorganism. This microorganism is inoculated into a culture medium containing 2% glucose, 1% peptone, 1% yeast extract and 0.3% NaCl. It is cultured at 30° C. for 24 hours in order to obtain a seed culture.

The seed culture is inoculated in the ratio of 10% by volume into a fermentation medium having the following composition:

Glycerol: 5%
$(NH_4)_2SO_4$: 1.4%
$KH_2PO_4$: 0.1%
$MgSO_4 \cdot 7H_2O$: 0.03%
$CaCO_3$: 2%
DL-methionine: 20 mg./l.

The pH of the medium is adjusted to 7.2 with NaOH before sterilization.

Twenty ml. portions of both media are poured into 250 ml.-conical flasks, respectively, and are used after sterilization. Culturing is then carried out with aerobic shaking of the culture at 30° C.

After 72 hours of culturing, L-threonine is produced and accumulated in the resultant culture liquor in the concentration of 830 mg./l.

EXAMPLE 6

Culturing is carried out in the same manner as described in Example 5, except that *Escherichia coli* KY 8269 ATCC 21319 (a strain requiring both methionine and cystine) is used as the seed microorganism. Moreover, the same fermentation medium as employed in Example 5 is used, except that 25 mg./l. DL-methionine and 30 mg./l. of L-cystine is employed in the medium instead of only DL-methionine. The amount of L-threonine produced after the completion of fermentation is 660 mg./l.

EXAMPLE 7

Fermentation is conducted in the same manner as described in Example 5, except that *Escherichia coli* KY 8268 ATCC 21320 (a strain requiring both methionine and tryptophan for its growth) is used as the seed microorganism. In addition, 25 mg./l. DL-methionine and 200 mg./l. of tryptophan is used in the fermentation medium instead of only DL-methionine. After the completion of fermentation, the amount of L-threonine produced is 250 mg./l.

The invention being thus described, it will be obvious that the same may be varied in many ways. Such variations are not to be regarded as a departure from the spirit and scope of the invention, and all such modifications as would be apparent to one skilled in the art are intended to be included.

I claim:

1. A process for producing L-threonine which comprises culturing a methionine-requiring microorganism capable of producing L-threonine and belonging to *Arthrobacter paraffineus* ATCC 21317 under aerobic conditions in an aqueous nutrient medium containing (1) at least five parts by weight of nitrogen per one hundred parts by weight of carbon and (2) methionine in an amount required for the growth of the microorganism at a temperature of about 20° to 40° C. and a pH of about 4.0 to 9.5, accumulating L-threonine in the resultant culture liquor, and recovering said L-threonine therefrom.

2. The process of claim 1, wherein about 10 mg./l. to 2 g./l. of methionine is present in the medium.

3. The process of claim 1, wherein a precursor of methionine is present in the medium in order to satisfy the growth requirement of said microorganism.

References Cited

UNITED STATES PATENTS 2,937,122  5/1960  Huang _____ 195—47

A. LOUIS MONACELL, Primary Examiner

J. R. HOFFMAN, Assistant Examiner

U.S. Cl. X.R.

195—47